May 25, 1954  M. A. GARRISON  2,679,383
WALL SCRAPER FOR DEEP WELLS
Filed Oct. 23, 1950  3 Sheets-Sheet 1
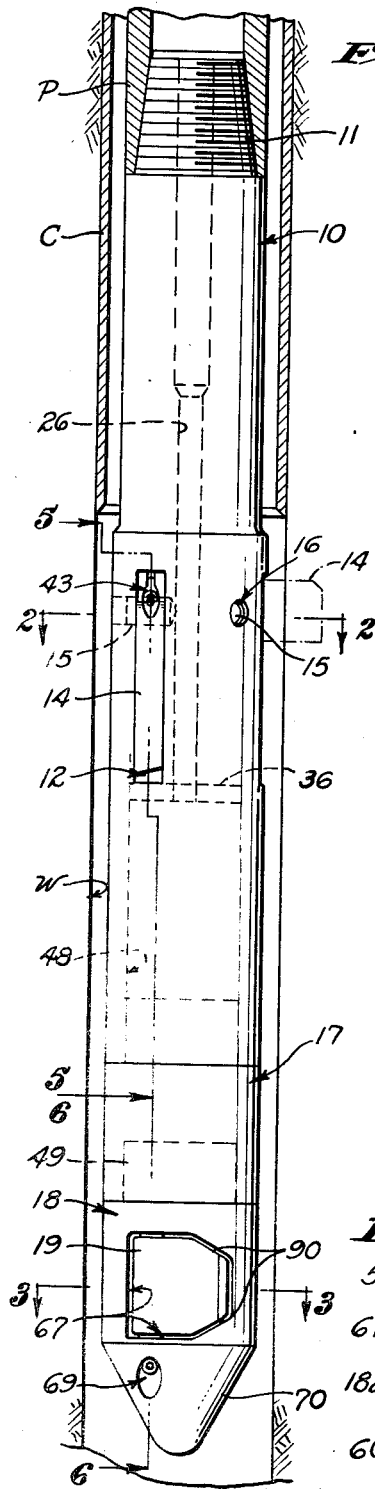
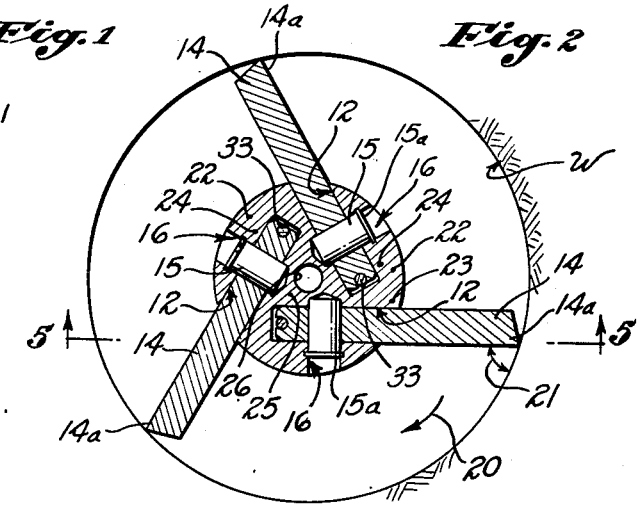
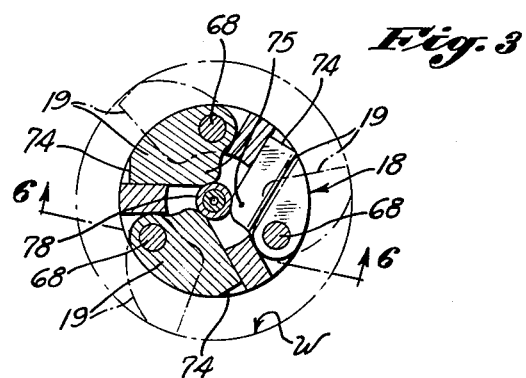
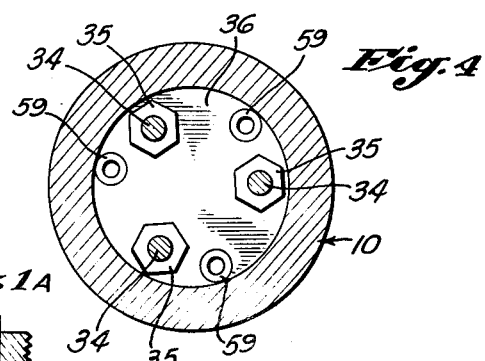
INVENTOR:
MARION A. GARRISON
BY HIS ATTORNEYS
HARRIS, KIECH, FOSTER & HARRIS

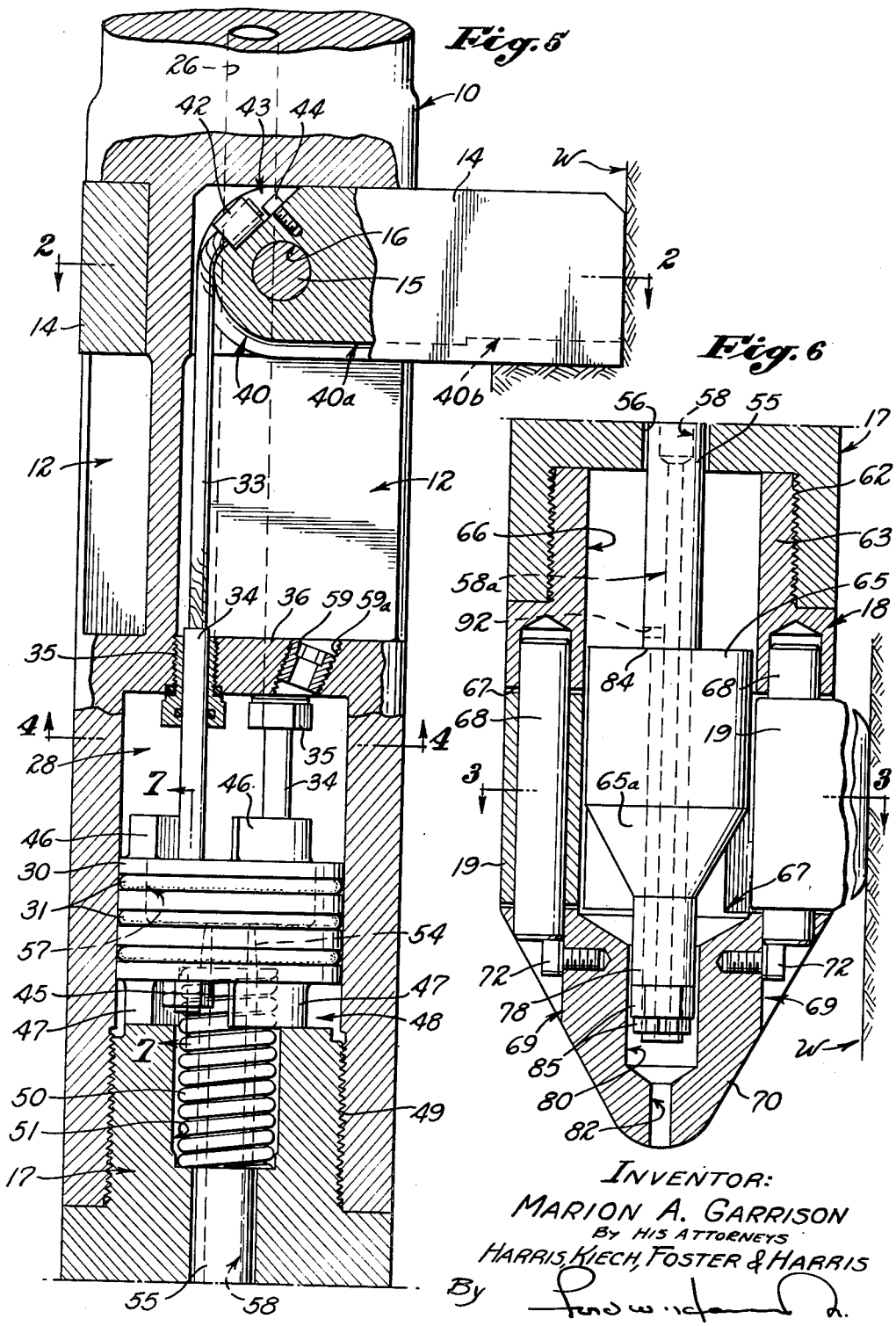

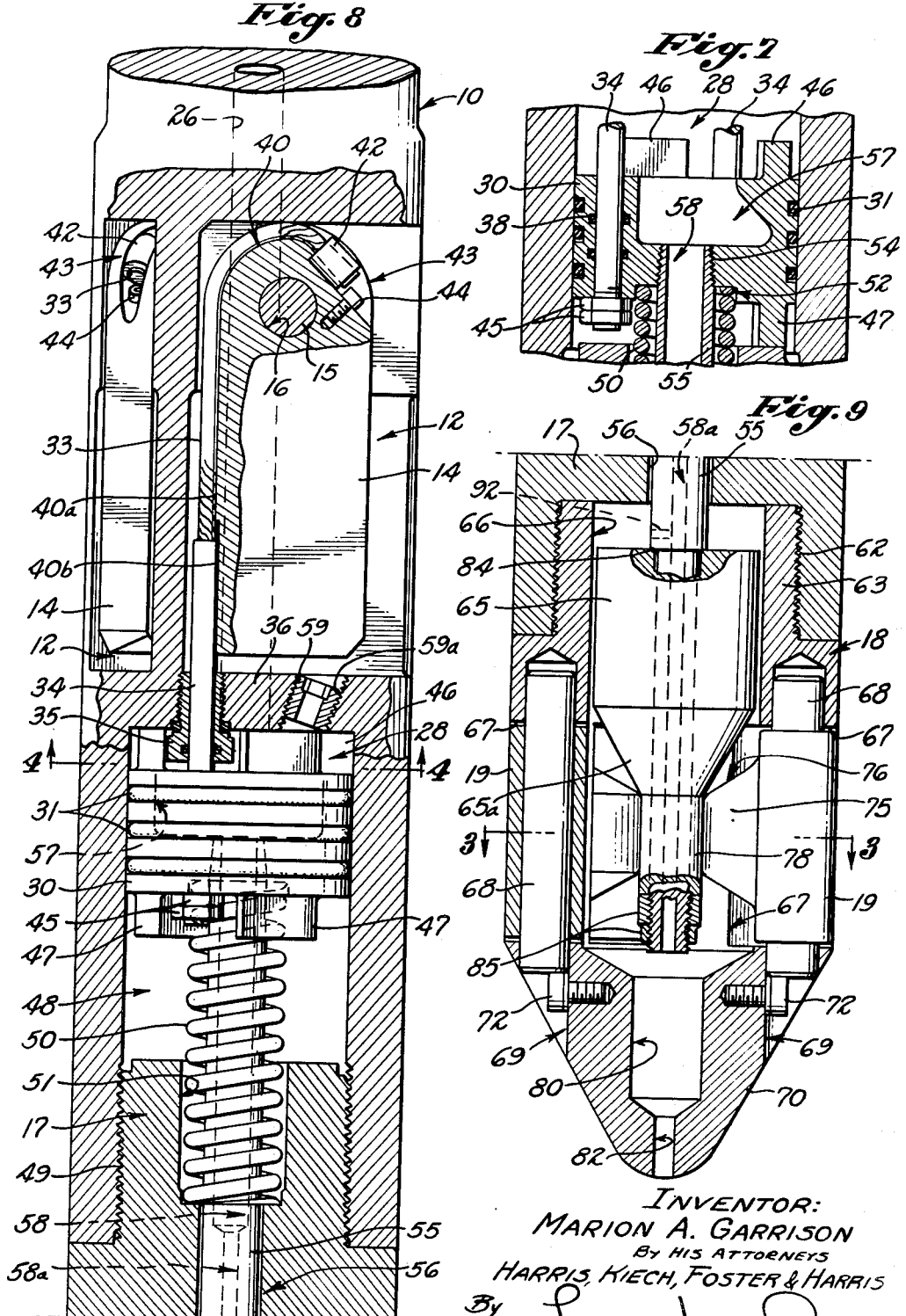

Patented May 25, 1954

2,679,383

UNITED STATES PATENT OFFICE 2,679,383

WALL SCRAPER FOR DEEP WELLS

Marion A. Garrison, Los Angeles, Calif., assignor to Regan Forge & Engineering Co., San Pedro, Calif., a corporation of California Application October 23, 1950, Serial No. 191,711

31 Claims. (Cl. 255—76)

This invention relates to apparatus for use in deep wells such as oil wells for the purpose of scraping the walls of the well holes or underreaming below casings which have been introduced into the wells.

One object of the invention is to provide a scraping device or underreaming type of device employing scraping blades, which are adapted to move outward in vertical planes, wherein all dead center positions of the blades are avoided, it being a special object to employ for such purpose means which apply a constant leverage to the blades as they are moved outward, thereby assuring the application of a blade-moving force that is at least as great at the beginning of the operation of opening the blade which is the critical point in the operation, as in other portions of the blade movement. An incidental object is to employ cable and pulley means which work upon constant radii at the inner ends of cutting blades that are swung outward into scraping or cutting positions beyond the bodies of instruments or tools carrying them.

Another object of the invention is to provide a wall scraper whose cutting blades may be positively and also readily returned from cutting position.

A still further object of the invention is to provide an arrangement in a wall-scraping tool whereby the cutting blades employed are so located that lateral strains imposed upon the blades during cutting operations are applied at the strongest possible points of the tool body on which they are mounted.

An incidental object is to arrange cutting blades of wall scrapers of the indicated type so that forces applied by one cutting blade serve to offset forces applied by an adjacent cutting blade, whereby such forces tend to offset or neutralize each other through the tool body and thereby reduce tendencies to distort or deform the tool body. Thus, it is an object of the invention to provide for maximum strength in the tool body through arrangement of preferably non-communicating slots or pockets in the tool body in which cutting blades are pivotally mounted.

A still further object of the invention is to dispose the cutting blades at such angles that the cutting edges of the blades tend to trail and thereby effect a negative rake upon the wall being cut or scraped; that is, the angle between the advancing side of the blade and the wall hole is something less than 90° as distinguished from an angle greater than 90° which would result if the leading edge of the scraping blade in each instance were pitched forward in the direction of the rotation.

It is, as a consequence, also an object to facilitate blade actuation by a combination of the favorable effects of a negative rake and the swinging of the blades in vertical planes into operative position by the uniform operating force of a constant, tangential pull on the inner ends of the respective blades and by means of which dead center positions are eliminated, as through the medium of the cable and pulley-actuating means above mentioned.

As an additional object of the invention, mud pressure actuated means, such as a piston, are employed to retain the cutting blades in position while operating and to keep the cables of the mentioned cable and pulley mechanism under constant tension during operation.

A further object of the invention is to provide for the direction of mud streams against the cutters during operation to lubricate the cutting blades and maintain their mounting pockets continually free from debris.

Still another object of the invention is to provide means at the nose of the instrument for guiding and centering the instrument in the well hole in which it is being used so that the cutting performed by the scraper blades may take place uniformly around the wall of the well hole. An incidental object is to use for such a centering purpose an adjustable or expanding pilot device which may itself be a non-digging structure having expanding contact shoes, which preferably will be self-closing or retracting when scraping operations are terminated.

Other objects of the invention and the various features of construction thereof will become apparent to those skilled in this art upon reference to the following specification and the accompanying drawings, wherein certain embodiments are disclosed by way of exemplification.

In the drawings:

Fig. 1 represents a vertical section through a deep well whose walls are indicated, a scraping tool of this invention being shown in elevation in the well hole and positioned on the lower end of a drill pipe;

Fig. 1A is a sectional detail showing a modification of a nose piece carried on the lower end of the instrument;

Fig. 2 is a cross section on an enlarged scale taken on the line 2—2 of Fig. 5 and indicated also by the line 2—2 of Fig. 1;

Fig. 3 is a cross section taken on the line 3—3 of Figs. 1 and 9 and at the position indicated by the line 3—3 of Fig. 6;

Fig. 4 is a cross section taken on the lines 4—4 of Figs. 5 and 8;

Fig. 5 is a vertical section taken on the line 5—5 of Fig. 2 and is indicated by the line 5—5 of Fig. 1, the cutter blades being extended, however, as in Fig. 2, and the parts being shown on an enlarged scale;

Fig. 6 is a view similar to that of Fig. 5 and is complementary to the showing of Fig. 5, the section being indicated by the line 6—6 of Fig. 1, the piloting shoes of the centering nose being, however, extended to the broken line position of Fig. 3 where the line of 6—6 represents the approximate position of the section;

Fig. 7 is a fragmentary vertical section taken on the line 7—7 of Fig. 5; and

Figs. 8 and 9 are vertical sections corresponding to those of Figs. 5 and 6 but showing the parts in retracted position.

The wall scraper illustrated comprises an elongated body 10 of cylindrical construction dimensioned for lowering through a well casing C into position adjacent the wall W of a deep well as seen in Fig. 1. The upper end of the body 10 is provided with a standard threaded tool-joint pin 11 to which the lower end of drill pipe or other pipe P may be attached for the purpose of introducing, rotating, and removing the instrument. Adjacent its strong upper end, the body 10 is provided with a plurality of longitudinally extending, non-communicating pockets 12 which receive a corresponding number of blade type cutters 14 having outermost vertical cutting edges 14a adapted to be swung between collapsed positions within the pockets 12, as indicated in full lines in Figs. 1 and 8, and horizontally extending operative positions, as seen in Figs. 2 and 5 and indicated in broken lines in Fig. 1. The cutters 14 are swingingly mounted upon and retained by transversely extending pivot pins 15 which are secured in bores 16 spanning the respective pockets 12. The pivot pins may be conveniently retained in the bores 16 by snap rings 15a or the like. By such mountings the cutters 14 are readily swung between the mentioned collapsed and extended positions. Threadedly affixed to the lower end of the body member 10 is an extension 17 which houses a portion of mechanism presently to be described, and threadedly affixed to the lower end of the extension 17 is a pilot nose 18 carrying projectible pilot shoes 19 by means of which the instrument may be centered within the wall W of the well hole, or, when preferred, the pilot nose 18 may be replaced, as seen in Fig. 1A, by some other terminal member 18a such as a diamond point bit or simple nose piece 18a.

As best seen in Fig. 2, the pockets 12 are disposed at substantial angles to the respective radii so that the cutters 14 are projected outward in a direction to trail as the instrument is rotated, its normal direction of rotation being indicated by the arrows 20 of Fig. 2. Under these conditions the cutters 14 possess a negative rake; in other words, the forward angle 21 (Fig. 2) between the forward face of each cutter 14 and the hole wall is less than 90° or about 75° or 80° so that during rotation, the respective vertical cutting edge 14a tends to slide off the hole wall rather than to dig into it as would occur if the respective cutter were positioned to provide a positive rake. Such an arrangement serves to avoid damage which might result were a positive rake employed. The width of each pocket 12 is substantially that of the thickness of its cutter 14, working clearance only being provided. It will be observed that, with the illustrated arrangement, there are provided between the pockets 12 corresponding vertically extending rigid body portions 22, each of which provides a bearing shoulder 23 against which the middle portion of the cutter 14 is urged by the cutting resistance encountered by the outer cutting edge 14a. The inner end of each cutter 14 when in operative position, as seen in Fig. 2, bears against a bearing part of the respective body portion 22 as indicated at 24. With this arrangement the force exerted against the part 24 is opposed by the force exerted by the adjacent cutter 14 against the adjacent shoulder 23. Thus, the outward pressure at the inner end of one cutter is offset by the circumferential pressure imparted by the middle portion of an adjacent, leading cutter 14. In this relationship, the inner ends of the various cutters are disposed about a central core 25 at the axis of which there is located a liquid passage 26 for the usual drilling fluid or drilling mud. As best seen in Fig. 2, there is no direct communication between adjacent pockets 12, and the bores 16 do not sufficiently extend into the core 25 to communicate with the axial passage 26 which extends from the top of the body 10 where it is fed by the drill pipe P.

The passage 26 leads to a cylindrical chamber 28 (Fig. 5) which contains a cutter-actuating piston 30 suitably packed within the chamber 28 by packing rings 31 or the like. Operation of the cutters 14 is effected by the piston 30 through the medium of corresponding cables 33 which are secured, as by swaging, to the upper ends of rods 34 that reciprocate in packing glands 35 secured in a transverse dividing wall 36 which separates the pockets 12 from the chamber 28. The lower ends of the rods 34 are slidably mounted in the piston 30 and are in turn packed therein by suitable packing means 38 as seen in Fig. 7. This permits movement of the piston 30 upward along the rods 34 under appropriate conditions. The upper ends of the cables 33 are secured in arcuate pulley-like grooves 40 in the inner ends of the cutters 14. Such securing of the upper ends of the cables 33 may be effected by means of heads 42 swaged or otherwise secured to the extremities of the cables 33, these heads being received in of the shouldered pockets 43 in the adjacent ends of the arcuate grooves 40. The pockets 43 are so shaped as to overhang side portions of the heads 42 to prevent dislodgement radially and set screws 44 prevent dislodgement circumferentially from the sockets 43. The curvature of the grooves 40 at the ends of the cutters 14 is on a constant radius so that pull by the cables 33 is constant and exerts a constant force on the respective cutters. As the grooves 40 extend toward the outer ends of the cutters, they straighten out to form extensions 40a which follow the inner sides of the cutters when in inoperative position as seen in Fig. 8. At the outer ends of the groove extensions 40a, the grooves are enlarged at 40b to accommodate the upper portions of the rods 34. With the described construction and arrangement of the cables 33 in the grooves 40, a constant leverage is applied to the respective cutters 14 as the piston 30 is moved downward whereby to swing the blade cutters 14 uniformly from their inoperative positions in the pockets 12, as in Fig. 8, to their operative extended positions as indicated in Figs. 2 and 5. With this arrangement there are no dead center positions, and blade actuation takes place by an even tangential pull exerted by the cables 33 to swing the cutters into wall-engaging relationship.

In order that the rods 34, which are slidably received in the piston 30, may be actuated by the latter, the lower ends of the rods 34 carry appropriate lock nut means 45 (Fig. 7) or the like against which the under side of the piston 30 engages. In the form illustrated the upper side of the piston is provided with upstanding spacer fingers 46 which are adapted to engage the under side of the dividing wall 36 around the locations of the projecting portions of the packing glands 35 and to provide a corresponding pocket in which such projecting portions are received when the pistons are in elevated position as illustrated in Fig. 8. Similarly, the under side of the piston 30 is provided with downwardly projecting fingers 47 which provide a corresponding pocket for reception of the lock nuts 46 on the lower ends of the rods 34 at the top of a chamber 48 which exists between the under side of the piston 30 and the upper end of the extension 17 of the body 10. As seen in Figs. 5 and 8, the upper end of the body extension 17 is threadedly connected to the lower end of the body 10 by internal threads 49. Disposed between the piston 30 and the body extension 17 is a coil expansion spring 50 whose lower end is seated and centered in a socket 51 in the upper reduced portion of the body extension 17 and whose upper end is similarly seated and centered in a shallow socket 52 in the under side of the piston 30.

Threadedly secured at 54 (Fig. 7) in the piston 30 is an axially disposed wash pipe 55 which extends through the coil spring 50 and the chamber 48 into an axial bore 56 in the body extension 17 and in which bore 56 the wash pipe 55 is adapted to reciprocate as the piston 30 reciprocates. In the construction illustrated (see especially Figs. 7 and 8) the upper portion of the piston 30 may be provided with a central pocket 57 in communication with the chamber 28 in communication with the upper end of a wash passage 58 in the wash pipe 55. Although the upper part of the wash passage 58 is shown as having a capacity approximating that of the axial fluid passage 26 through the body 10, the lower portion of the wash passage 58 is restricted as indicated at 58a in Figs. 6, 8, and 9. This restriction 58a places a back pressure upon the fluid in the chamber 28 which serves to force the piston 30 and the wash pipe 55 downward against the tension of the spring 50 when desired to swing the blade cutters 14 from the inoperative or collapsed position of Fig. 8 to the extended, operating position of Fig. 5. This back pressure serves further to jet a high pressure stream of fluid upward and at an angle through flow beans or jetting nozzles 59 which are threadedly mounted at 59a in the dividing wall 36. One of these nozzles 59 is provided for each cutter 14 and it is disposed to clear the bottom of the respective pocket 12 and also to wash the wall of the well hole in the vicinity of the respective cutter 14 and lubricate the latter.

If a simple form of nose piece or terminal member 18a is employed as shown in Fig. 1A, the lower end of the wash pipe 55 simply extends into a corresponding bore 60 therein, the upper end of the terminal member 18a having a reduced threaded extension 61 to enter a corresponding recess in the lower end of the body extension 17 and to engage threads 62 thereof.

However, in the preferred form of construction, threads 62 in the lower end of the extension 17 receives a reduced, threaded, upper end portion 63 of the pilot nose 18 of Figs. 1, 6, and 9 provided with the previously mentioned pilot shoes 19. In this preferred form of construction, there is fixed to the lower end of the wash pipe 55 an expander 65 which will be termed a cone expander because its lower portion 65a is frusto-conical in form for the purpose of actuating the pilot shoes 19 to move them from the retracted position of Figs. 3 and 9 to the expanded broken line position of Fig. 3 and the position indicated in Fig. 6. The body portion of the expander 65 is cylindrical and reciprocates in a cylinder 66 within the body of the pilot nose 18. The pilot shoes 19 are mounted in pockets 67 to swing upon vertical axes provided by vertically disposed pivot pins 68 carried in the wall portions of the body of the pilot nose 18. These pins 68 are introduced into vertical bores 69 which extend upward from the lower conical tip 70 of the pilot nose 18 and are held in operative position by means of set screws 72 threaded radially into position as shown in Figs. 6 and 9.

Each shoe 19 is provided with an outer arcuate portion, as best seen in Fig. 3, which lies flush with the body of the pilot nose 18 when in retracted position, its swinging extremity being preferably snubbed off somewhat as indicated at 74 to engage the wall W of the well hole. As seen in Figs. 3 and 9, each pilot shoe 19 is provided with an inwardly extending portion 75 provided with an upper cam-like face 76 to be engaged by the frusto-conical portion 65a of the expander 65. Thus, as fluid under pressure is applied in the chamber 28 in the body 10 to the piston 30 to force the latter downward along with the wash pipe 55, the cone expander 65, by reason of engagement of its frusto-conical portion 65a with the upper cam faces 76 forces all of the pilot shoes 19 outward from the collapsed position of Figs. 3 and 9 to the expanded position of Fig. 6 which is the broken line position of Fig. 3. As the cone expander 65 is moved downward from the position of Fig. 9 to the position of Fig. 6, its lowermost, reduced extremity 78 below the frusto-conical portion 65a enters a well 80 in the conical tip 70 below the cylinder 66, which well 80 communicates with the exterior through a small discharge bore 82 aligned with the restricted passage 58a in the wash pipe 55. For the purpose of retaining the expander 65 in fixed position on the wash pipe 55, the latter is shouldered as indicated at 84 (Fig. 7) for abutment of the top of the expander 65 thereagainst, and lock nuts 85 are threaded on the lower end of the wash pipe 55 and bound against the bottom face of the reduced extremity 78. Thus, upon release of pressure in the chamber 28 against the piston 30, when the compressed spring 50 elevates the piston 30 from the position of Fig. 5 to that of Fig. 8, the cone expander 65 is simultaneously elevated from the position of Fig. 6 to that of Fig. 9 to free the inwardly extending portions 75 of the pilot shoes 19. When so freed, the shoes 19 may be caused to return to their retracted positions upon rotation of the instrument in a clockwise direction. By tapering the swinging or trailing end of each shoe as shown at 90 in Fig. 1, retraction of the shoes 19 during elevation and rotation of the instrument will be assured. Inasmuch as the under side of the swinging end of each shoe is similarly tapered, a similar effect may be produced if an obstruction is encountered during lowering operations.

Operations

In preparing for scraping the walls of a hole, the instrument is assembled and threaded onto the lower end of the drill pipe P as illustrated in Fig. 1, any given instrument being of a given diameter relative to a well casing C through which it is to be lowered so that it may be readily lowered therethrough and at the same time provide for subsequent expansion of the blade cutters 14 into operative position below the well casing C. Scraping will ordinarily begin close to the bottom of the casing C, and when such a position has been reached, drilling mud or other appropriate liquid is pumped down through the drill pipe P into the axial passage 26 in the body 10 and thence to the chamber 28 housing the piston 30. By reason of the restricted passage 58a in the wash pipe 55 back pressure builds up in the chamber 28 with the result that the piston 30 is forced downward from the position of Fig. 8 to the position of Fig. 5. The wash pipe 55 being affixed to the piston 30 (Fig. 7), its movement downward through the bore 56 in the body extension 17 also depresses the cone expander 65, 65a, with the result that the pilot shoes 19 are projected into the broken line position of Fig. 3 and the full line position of Fig. 6, thereby centering the nose of the instrument. At the same time that the piston 30 and expander 65 are depressed, the cables 33 exert a uniform leverage action upon the inner ends of the blade cutters 14 and swing them toward the full line position of Fig. 5 which is also indicated in broken lines for one of the cutters 14 in Fig. 1. The instrument is then rotated from the surface by the drill pipe P in a conventional manner and gradually lowered. As the lowering gets under way, the cutters 14 advance more or less gradually to their full operative position seen in Fig. 5 so that they fulcrum at the middle portions of their upper edges against the overhanging shoulders of the body 10 provided by the top walls of the respective pockets 12. During this operation, the shoes 19 will have been expanded into the walls W of the well hole (Figs. 3 and 6), assuming proper selection of sizes. Should the outer swinging portion of the pilot shoes 19 have contacted irregular portions of the walls W before the blade cutters 14 reach their maximum operating position, as seen in Fig. 5, so that friction completes the swinging movement of the cutters 14 outward and upward, the stiffness of the cables 33 will result in the sliding of the rods 34 through the packing glands 35 and the packings 38 in the piston 30 whereby to avoid any buckling of the cables 33. Thereafter, gradual lowering of the instrument on the lower end of the drill pipe causes a shoulder to be cut in the walls of the well hole as seen in Fig. 5. The back pressure built up in the chamber 28 in the body 10 results in streams of pressure fluid being ejected angularly upward from the jet nozzles 59 to keep the lower ends of the pockets 12 clear and to lubricate the cutting ends of the blade cutters 14. As long as pressure fluid is supplied to the chamber 28, the piston 30 will be depressed, the blade cutters 14 maintained in their outwardly swung operative positions, and the cone expander 65 held depressed to maintain the pilot shoes 19 in their outwardly extended operative instrument-centering positions. Upon release of pressure in the drill pipe P and the chamber 28, the compressed coil spring 50 acts to return the piston to its elevated position shown in Fig. 8 so that the pilot shoes 19 will be released for retraction into their pockets 67.

Inasmuch as the blade cutters 14 will be hung up on the shoulder of the well hole wall, as seen in Fig. 5, the rising of the piston 30 under the influence of the spring 50 will cause it to slide along the rods 34. Upon lifting of the drill pipe and the instrument, the cutters 14 will swing downward into their pockets 12, and upon appropriate rotating movement the pilot shoes will be positively retracted into their pockets 67. As the instrument is withdrawn through the well casing C, toward the surface, the bottom of the well casing engages and completes the retraction of the cutters 14 and the tapering portions 90 at the ends of the pilot shoes 19 (Fig. 1) act to assure completion of the retraction of the pilot shoes into their pockets 67.

If necessary to provide for flushing of the lower portion of the cylinder 66 in which the expander 65 operates, a small amount of pressure fluid may be by-passed from the restricted passage 58a through any appropriate by-passing port such as indicated at 92 in Fig. 6. Inasmuch as the pivot pins 68 may be removed downward through their bores 69, after removal of the set screws 72, the pilot shoes 19 may be readily changed to accommodate the bore hole size below the casing C. Similarly, the cutters 14 may be changed when required.

From the foregoing it will be apparent that the pulley-like arrangement provided by the arcuate groove 40 at the inner end of each blade cutter 14 will result in uniform leverage to swing the cutter out into position, by reason of the uniform radius on which the arcuate groove 40 is constructed. Thus, there is no point anywhere in the movement of the cutter for any dead center position, and the leverage at the beginning of the opening operation, which is the critical point, is equal to the leverage at all other positions. Also, the negative rake provided by the angular disposition of the cutter blades with respect to the direction of rotation, as illustrated in Fig. 2, results in a tendency for the cutters to slide over obstructions rather than to dig into the hole wall in a forward direction which might more readily result in damage to a given cutter. Thus, the angle 21 between the forward face of each cutter and the adjacent portion of the wall of the hole is always somewhat less than 90°.

By reason of the arrangement of the blade cutters 14 as shown in Fig. 2, maximum strength in the body 10 is attained. This is due in part to the fact that the cutters 14 are located next to the solid upper end of the body 10 above the piston chamber 48 and also that there are continuous walls between the pockets 12, there being no communication between the pockets nor between the pockets and the axial fluid passage 26, nor between the passage 26 and the bores 16 for the pivot pins 15. As previously indicated, further strengthening is insured by reason of the offsetting of the outward pressure at the inner end of each cutter 14 against its bearing part 24 by the circumferential pressure of the adjacent cutter 14 against its bearing shoulder 23.

In normal operation, the piston 30 is always depressed and the cables 33 are always under tension so that the cutters 14 are always held up in operative position. Again, by reason of the location of the piston 30 below the cutters 14, this piston serves the further purpose of projecting the pilot shoes 19 into their operative positions against the wall of the hole and retaining them in such positions so as to center the lower end of the instrument. Such arrangement of the piston 30 and the pressure chamber 28 also makes a convenient provision for the application of pressure fluid through the flow beans or jet nozzles 59 to clear the pockets 12 and lubricate the cutters 14. An additional advantage is found in the fact that the pilot shoes 19 are readily retracted, following the release of pressure upon the piston 30, upon rotation of the instrument and upward movement. Similarly the blade cutters 14 are easily retracted upon upward movement and withdrawal of the instrument into the well casing C. Where using the preferred form of pilot nose 18 with the expanding pilot shoes 19, it is unnecessary that the nose 18 be in the form of a digging device to assist in centering. It is therefore of non-digging nature. However, where desired, the nose 18a of Fig. 1A may be in the form of a digging device, such as the so-called diamond point bit.

I claim as my invention:

1. In combination in a wall-cutting device: an elongated body adapted to be lowered into a well, said body having laterally opening pockets, a transverse wall adjacent said pockets, and an internal cylinder chamber adjacent said wall and said pockets; a piston disposed in said chamber; cutters pivotally mounted at their inner ends in said pockets and having pivots mounted on said body at fixed positions on said body to swing outward into wall-cutting positions; cables attached to said inner ends of said cutters and to said piston; and conduit means through said body for supplying pressure fluid therethrough to said chamber and piston to actuate said piston and said cables and cutters.

2. A combination as in claim 1 wherein said body includes an integral core which is integral with adjacent wall portions of said pockets and renders said pockets non-communicating.

3. A combination as in claim 1 wherein said pockets extend longitudinally of said body and said cutters are pivoted to swing in planes longitudinal with respect to said body.

4. A combination as in claim 3 wherein said inner ends of said cutters are provided with arcuate grooves receiving said cables.

5. A combination as in claim 4 wherein each of said grooves is formed on a constant radius having its center at the axis of the pivotal mounting of the respective cutter.

6. A combination as in claim 1 wherein the inner ends of said cutters are provided with arcuate grooves receiving said cables.

7. A combination as in claim 1 wherein said pockets are disposed above said cylinder chamber, have a total cross sectional area much less than that of said chamber, and are thus located in an upper relatively stronger portion of said body than the portion housing said chamber.

8. A combination as in claim 6 wherein each of said grooves is a pulley-like groove formed on a constant radius about the axis of pivotal mounting of the respective cutter.

9. A combination as in claim 1 including means bearing on said piston to positively return said piston upon release of pressure on said fluid.

10. A combination as in claim 1 wherein said transverse wall is located below said pockets and said cylinder chamber is located below said wall.

11. In combination in a wall-cutting device: an elongated body adapted to be lowered into a well, said body having laterally opening pockets and an internal cylinder chamber; a piston disposed in said chamber; cutters having their inner ends pivotally mounted in said pockets to swing outward into wall-cutting positions; actuating means interconnecting said cutters and said piston; means for supplying pressure fluid to said chamber and said piston to move said piston, said actuating means and said cutters; extensible pilot means in the lower end portion of said body, said pilot means having cam means for extending such pilot means laterally outward to engage the wall of said well; expander means carried within said lower end portion to engage said cam means and extend said pilot means; and means connecting said piston to said expander means to move said expander means as said piston is actuated.

12. A combination as in claim 11 including resilient means to return said piston and said expander upon release of pressure on said fluid.

13. A combination as in claim 11 wherein said piston, said connecting means, and the lower end portion of said body contain aligned fluid passages to vent said pressure fluid from the bottom of said device.

14. In combination in a wall-cutting tool: an elongated body having a lower pilot end and adapted to be lowered into a well hole alongside the wall thereof, said body having laterally opening pockets in side portions thereof, a cylindrical chamber below said pockets to receive operating fluid under pressure, and laterally opening recesses in a lower portion of said body; a piston disposed in said chamber; swinging cutters disposed in said pockets; pivot means pivotally mounting inner ends of said cutters in said pockets for swinging of outer ends of said cutters to and from said pockets; actuating means connecting said piston with said cutters to swing said cutters; centering means in said recesses and movable laterally outward to engage said hole wall to center the lower portion of said tool; expander means in said lower portion of said body in engagement with said centering means; and connecting means between said expander means and said piston for actuating said expander means from said piston, said body having a pressure fluid passage leading downward therethrough to supply pressure to said piston to actuate the latter and said expander.

15. A combination as in claim 14 including resilient means connected with said piston and expander to return the same upon release of pressure on said fluid.

16. A combination as in claim 15 including a restricted pressure fluid passage leading from said chamber to lead off pressure fluid and to cause back pressure to build up in said chamber and actuate said piston.

17. A combination as in claim 16 including jet means communicating between said chamber and said pockets to jet pressure fluid under said back pressure upward into said pockets toward said cutters for clearing said pockets and lubricating said cutters.

18. In combination in a wall-cutting apparatus: an elongated body having means at its top for attachment to the lower end of drill pipe and adapted to be lowered into a well hole, said body having a relatively strong upper end and having below and adjacent said upper end and in its side portions laterally opening pockets and also having transverse wall means below said pockets and having a central piston chamber below said wall means and pockets and producing a relatively weaker portion of said body; a piston reciprocable in said chamber; swinging cutter blades mounted in said pockets; pivot means pivotally mounting inner end portions of said blades in said pockets for swinging of outer end portions of said blades outward into engagement with the wall of said hole; actuating means extending through said wall means and packed therein and connecting said piston with inner end portions of said cutter blades to swing said blades through piston actuation; and pressure fluid supply means for leading pressure fluid through said apparatus to said piston chamber for actuation of said piston.

19. A combination as in claim 18 wherein said pivot means for said blades are mounted in said body in fixed positions.

20. A combination as in claim 18 including jetting means carried in said wall means between said piston chamber and said pockets and in position for directing pressure fluid from the top of said chamber into the bottoms of said pockets and toward said cutter blades to clear said bottoms of said pockets and lubricate said blades.

21. A combination as in claim 18 wherein restricted passage means are provided in said apparatus to vent pressure fluid from said body and provide also for developing back pressure in said piston chamber to operate said piston and blades.

22. A combination as in claim 18 wherein said pockets are narrow and extend longitudinally of said body at angles to each other and to all radii, a central integral core of said body being provided between said pockets and integral with the side walls of said pockets to render said pockets free from communication with one another through said body and to stiffen said body by said integral core, said fluid supply means including a passage disposed axially in said core.

23. A combination as in claim 22 wherein the angles of the pockets and their blades are directed to provide a negative rake fo reach blade.

24. A combination as in claim 18 wherein said pockets are narrow and extend longitudinally of said body and are directed outward at angles to all radii and to each other to provide a negative rake for each blade, a central integral core of said body being provided between the inner portions of said pockets and being integral with the side walls of said pockets so that circumferential pressure of one blade at the circumferential edge of its pocket tends to offset outward pressure by the inner end of an adjacent blade, said pockets being free from communication with one another through said body.

25. A combination as in claim 24 wherein the angular relationship of each blade with respect to the contacted portion of the wall hole is appreciably less than 90° on the advancing side of each blade to provide said negative rake.

26. In combination in a wall-cutting tool for deep wells: an elonagted rotatable body having at its upper end for attachment to the lower end of drill pipe and having a plurality of longitudinally extending pockets below said upper end opening laterally outward of said body; cutter blades mounted in said pockets to swing outward in vertical planes; plural pivot means mounted on said body in fixed positions in said body and extending transversely of the respective pockets and the inner ends of the respective cutter blades to mount said blades, said pockets and their blades being directed outward at angles to corresponding radii in position to provide a negative rake for each blade, the inner ends of said pockets being free from communication with one another and lying alongside of and forming between them a central integral core in said body integral with the side walls of each pocket to rigidify the body, each pocket providing a circumferential bearing point for the trailing side of its blade and an inner bearing point within the respective pivot means for the inner end of such blade, such inner bearing point being on the outermost of the inner side walls of the respective pocket and lying adjacent the circumferential bearing point of the adjacent leading blade so that the forces applied during rotative operation at such adjacent bearing points tend to offset each other; and piston and cylinder means below said pockets and receiving pressure fluid through a bore in said core and having connection with said blades to extend said blades.

27. A combination as in claim 26 wherein the top of each pocket provides a bearing for the upper edge of its blade when in vertical operating position.

28. A combination as in claim 26 wherein an an axial fluid passage is provided through said central core and supplies said cylinder means.

29. A combination as in claim 26 wherein said means to extend said blades include parts located in a chamber, said pockets and blades being positioned above said chamber.

30. In combination in a wall-cutting tool for deep wells: an elongated rotatable body having a plurality of longitudinally extending pockets opening laterally outward of said body; cutter blades mounted in said pockets to swing outward in vertical planes; plural pivot means mounted in said body and extending transversely of the respective pockets and the inner ends of the respective cutter blades to mount said blades, said pockets and their blades being directed outward at angles to corresponding radii, the inner ends of said pockets lying alongside of and forming between them a central core integral with said body and with adjacent wall portions at the sides of said pockets, whereby said pockets are noncommunicating; and means to extend said blades and disposed below said pockets and blades.

31. In combination in a wall-cutting apparatus: an elongated body adapted to be lowered into a well hole, said body having a relatively strong upper end and having below and adjacent said upper end and in its side portions laterally opening pockets and also having a central piston chamber spaced below said pockets and producing a relatively weaker portion of said body; a piston reciprocable in said chamber; swinging cutter blades mounted in said pockets; pivot means pivotally mounting inner end portions of said blades in said pockets for swinging of outer end portions of said blades outward into engagement with the wall of said hole; actuating tension members leading upward from said piston to the inner portions of said cutter blades and connecting said piston with inner end portions of said cutter blades to swing said blades through piston actuation; and pressure fluid supply means for leading pressure fluid through said apparatus to said piston chamber for actuation of said piston.

References Cited in the file of this patent

UNITED STATES PATENTS

| Number | Name | Date |
| --- | --- | --- |
| 1,483,611 | Miller | Feb. 12, 1924 |
| 1,604,200 | Shaw | Oct. 26, 1926 |
| 1,611,282 | Samuelson | Dec. 21, 1926 |
| 2,116,898 | Johnson | May 10, 1938 |
| 2,457,628 | Baker | Dec. 28, 1948 |

FOREIGN PATENTS

| Number | Country | Date |
| --- | --- | --- |
| 407,051 | France | Feb. 18, 1901 |